(12) United States Patent
Chien et al.

(10) Patent No.: US 7,180,583 B2
(45) Date of Patent: Feb. 20, 2007

(54) APPARATUS FOR INDICATING POSITION OF AN INCIDENT LIGHT BEAM

(75) Inventors: Pie-Yau Chien, Taichung (TW); Bing Sheng, Hang-zhou (CN); Li-Ming Lin, Hang-zhou (CN)

(73) Assignee: Asia Optical Co., Inc., Taichung (TW)

( * ) Notice: Subject to any disclaimer, the term of this patent is extended or adjusted under 35 U.S.C. 154(b) by 284 days.

(21) Appl. No.: 10/874,586

(22) Filed: Jun. 22, 2004

(65) Prior Publication Data

US 2005/0195410 A1    Sep. 8, 2005

(30) Foreign Application Priority Data

Mar. 4, 2004    (TW)    ................ 93105711 A

(51) Int. Cl.
*G01C 1/00* (2006.01)
*G01B 11/26* (2006.01)
(52) U.S. Cl. ................................. 356/139.04
(58) Field of Classification Search ............ 356/139.04
See application file for complete search history.

(56) References Cited

U.S. PATENT DOCUMENTS 5,189,484 A * 2/1993 Koschmann et al. ........ 356/138

2002/0012898 A1 * 1/2002 Shechter et al. .............. 434/21

* cited by examiner

*Primary Examiner*—Thomas H. Tarcza
*Assistant Examiner*—Luke D. Ratcliffe
(74) *Attorney, Agent, or Firm*—Christie, Parker & Hale, LLP.

(57) ABSTRACT

An apparatus, which is for assisting in calibration of an optical axis of a light beam generated by a light emitter of an instrument, includes a body, a sensor module, and an indicator module. The instrument includes a sighting unit that has a specified position relationship with the light emitter. The body has a surface provided with a reference mark. The sensor module is mounted on the surface of the body, generates an output signal upon receipt of the light beam generated by the light emitter of the instrument, and has a reference position relationship with the reference mark. The reference position relationship corresponds to the specified position relationship between the sighting unit and the light emitter. The indicator module is associated operably with the sensor module, and indicates position of an incident light beam received by the sensor module.

7 Claims, 3 Drawing Sheets

APPARATUS FOR INDICATING POSITION OF AN INCIDENT LIGHT BEAM

CROSS-REFERENCE TO RELATED APPLICATION

This application claims priority of Taiwanese application no. 093105711, filed on Mar. 4, 2004.

BACKGROUND OF THE INVENTION

1. Field of the Invention

The invention relates to a position indicating apparatus, more particularly to an apparatus that indicates position of an incident light beam and that is used in the calibration of light-emitting instruments.

2. Description of the Related Art

Light-emitting instruments are required to be calibrated before being sold to consumers. The light-emitting instrument generally includes a light emitter that generates a light beam, and a sighting unit that is provided with a cross hair. The cross hair includes a pair of lines that intersect at a reference point, and has a specified position relationship with the light emitter.

A conventional method for calibrating an optical axis of the light beam generated by the light emitter of the light-emitting instrument includes the steps of:

1. forming a reference mark, which includes a pair of lines that intersect at a reference point, and a target area, which has a reference position relationship with the reference mark, on a surface of a wall;

It is noted that the reference position relationship between the reference mark and the target area corresponds to the specified position relationship between the cross hair on the sighting unit and the light emitter.

2. with the light-emitting instrument disposed at a distance away from the surface of the wall, aligning the cross hair on the sighting unit of the light-emitting instrument with the reference mark on the surface of the wall; and 3. calibrating the optical axis of the light beam generated by the light emitter of the light-emitting instrument such that the light beam is incident upon desired position in the target area.

Although the aforementioned conventional method may be conducted to calibrate the optical axis of the light beam generated by the light emitter of the light-emitting instrument, since the light-emitting instrument is required to be located at a relatively far distance from the wall in order for the optical axis to be accurately calibrated, the position of the incident light beam in the target area may not be clearly visible to the tester who is operating the light-emitting instrument. As such, during the calibration, the tester has to walk back and forth between the wall and the light-emitting instrument to verify the position of the incident light beam in the target area and to calibrate the optical axis of the light beam, which is inconvenient, error prone, and time consuming. Otherwise, an assistant has to be positioned near the wall to assist the tester during the calibration operation, which results in an increase in labor costs.

SUMMARY OF THE INVENTION

Therefore, the object of the present invention is to provide an apparatus for assisting in calibration of a light-emitting instrument so as to improve efficiency of the calibrating operation.

According to one aspect of the present invention, an apparatus for indicating position of an incident light beam includes a body, a sensor module, and an indicator module. The apparatus is adapted for assisting in calibration of an optical axis of a light beam generated by a light emitter of a light-emitting instrument. The light-emitting instrument further includes a sighting unit that has a specified position relationship with the light emitter. The body has a surface provided with a reference mark. The sensor module is mounted on the surface of the body, and includes an array of photo-detectors, each of which is adapted to generate an output signal upon receipt of the light beam generated by the light emitter of the light-emitting instrument. A specified one of the photo-detectors has a reference position relationship with the reference mark. The reference position relationship corresponds to the specified position relationship between the sighting unit and the light emitter. The indicator module is associated operably with the sensor module, and includes an array of indicator units, each of which corresponds to a respective one of the photo-detectors and is capable of providing an indication when the respective one of the photo-detectors generates the output signal.

According to another aspect of the present invention, an apparatus for indicating position of an incident light beam includes a body, a sensor module, and an indicator module. The apparatus is adapted for assisting in calibration of an optical axis of a light beam generated by a light emitter of a light-emitting instrument. The light-emitting instrument further includes a sighting unit that has a specified position relationship with the light emitter. The body has a surface provided with a reference mark. The sensor module is mounted on the surface of the body, and includes a plurality of photo-detectors, each of which is adapted to generate an output signal upon receipt of the light beam generated by the light emitter of the light-emitting instrument. A specified one of the photo-detectors has a reference position relationship with the reference mark. The reference position relationship corresponds to the specified position relationship between the sighting unit and the light emitter. The indicator module is mounted on the surface of the body, is coupled to the sensor module, and includes a plurality of indicator units, each of which corresponds in position to a respective one of the photo-detectors and is capable of providing an indication when the respective one of the photo-detectors generates the output signal.

According to yet another aspect of the present invention, an apparatus for indicating position of an incident light beam includes a body, a sensor module, and an indicator module. The apparatus is adapted for assisting in calibration of an optical axis of a light beam generated by a light emitter of a light-emitting instrument. The light-emitting instrument further includes a sighting unit that has a specified position relationship with the light emitter. The body has a surface provided with a reference mark. The sensor module is mounted on the surface of the body, and includes a plurality of photo-detectors, each of which is adapted to generate an output signal upon receipt of the light beam generated by the light emitter of the light-emitting instrument. A specified one of the photo-detectors has a reference position relationship with the reference mark. The reference position relationship corresponds to the specified position relationship between the sighting unit and the light emitter. The indicator module is associated operably with the sensor module, and is capable of indicating which one of the photo-detectors generated the output signal.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
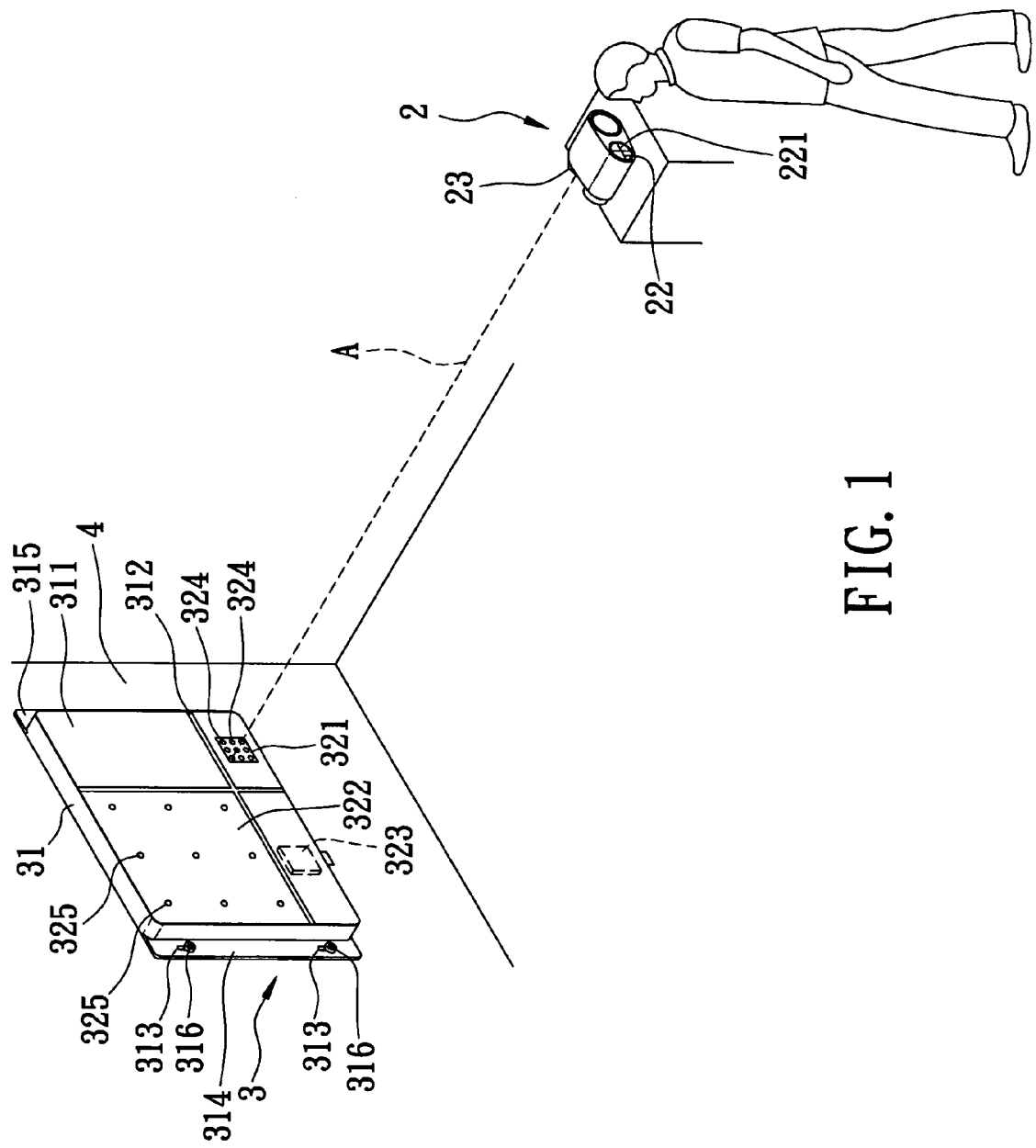
FIG. 1 is a perspective view of the first preferred embodiment of an apparatus for indicating position of an incident light beam according to the present invention.

Before the present invention is described in greater detail, it should be noted that like elements are denoted by the same reference numerals throughout the disclosure.

Figure 2:
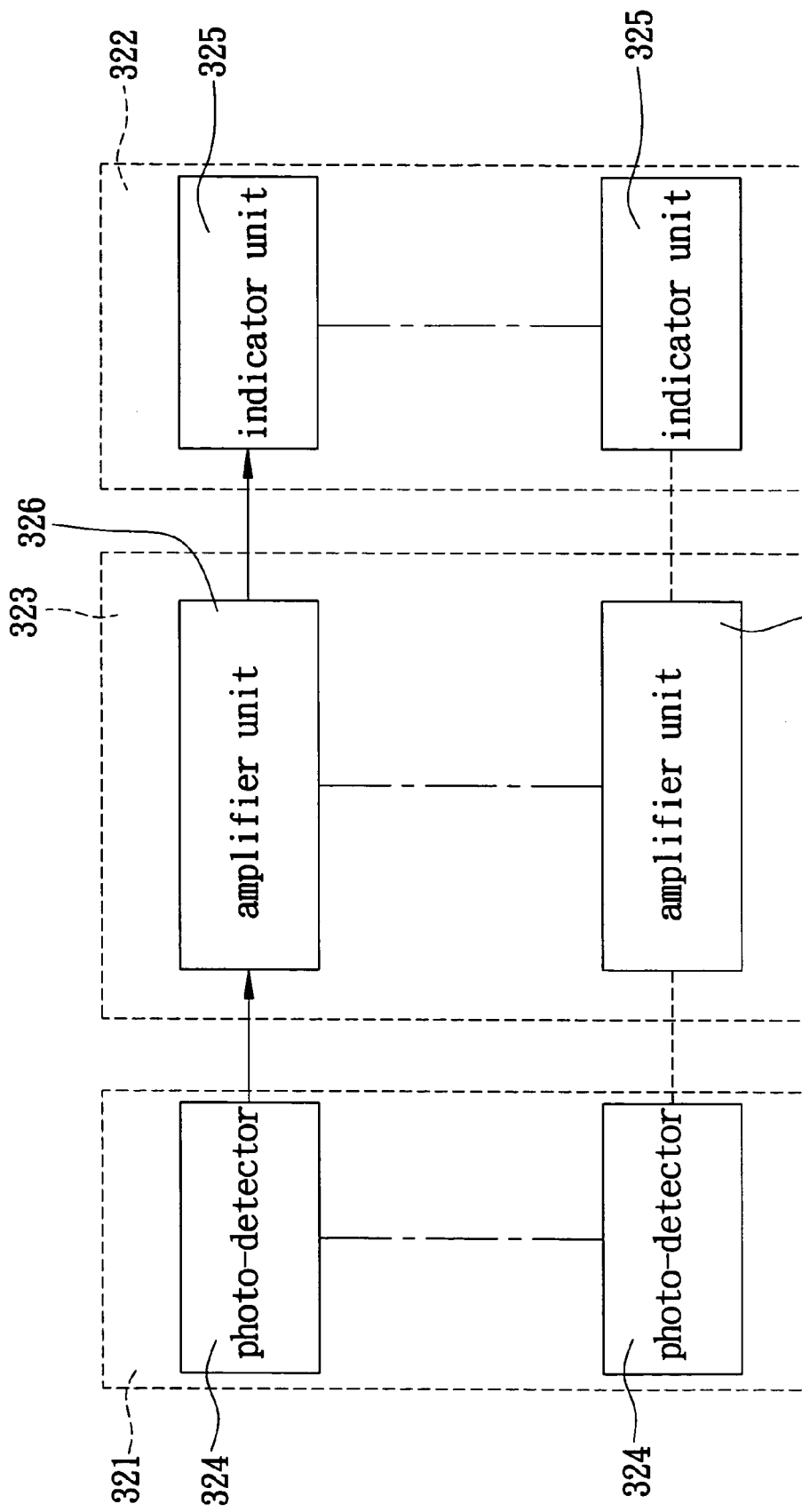
FIG. 2 is a circuit block diagram to illustrate a sensor module, an indicator module, and a driver module of the first preferred embodiment.

Referring to FIGS. 1 and 2, the first preferred embodiment of an apparatus 3 for indicating position of an incident light beam according to this invention is shown to include a body 31, a sensor module 321, and an indicator module 322.

The apparatus 3 is adapted for assisting in calibration of an optical axis (A) of a light beam generated by a light emitter 23 of a known light-emitting instrument 2, such as a laser distance measuring device or a laser level. The light-emitting instrument 2 further includes a sighting unit 22 that is provided with a cross hair 221. The cross hair 221 has a specified position relationship with the light emitter 23, and includes a pair of lines that intersect at a reference point.

The body 31 has a surface 311 provided with a reference mark 312. In this embodiment, the reference mark 312 is a cross hair. As shown in FIG. 1, the reference mark 312 includes a pair of lines that intersect at a reference point, and divides the surface of the body 31 into an upper left quadrant, an upper right quadrant, a lower left quadrant, and a lower right quadrant.

The sensor module 321 is mounted on the lower right quadrant of the surface 311 of the body 31. In this embodiment, the sensor module 321 includes a three by three array of photo-detectors 324, each of which is adapted to generate an output signal upon receipt of the light beam generated by the light emitter 23 of the light-emitting instrument 2. Preferably, each of the photo-detectors 324 is an avalanche photo-detector (APD).

It is noted that a specified one of the photo-detectors 324 has a reference position relationship with the reference mark 312. In this embodiment, the reference position relationship corresponds to the specified position relationship between the cross hair 221 on the sighting unit 22 and the light emitter 23. Preferably, the specified one of the photo-detectors 324 is a centermost one of the photo-detectors 324 in the array of the photo-detectors 324, and has the reference position relationship with the reference point of the cross hair 312.

In this embodiment, the indicator module 322 is mounted on the upper left quadrant of the surface 311 of the body 31, is associated operably with the sensor module 321, and includes a three by three array of indicator units 325, each of which corresponds to a respective one of the photo-detectors 324 and is capable of providing an indication, i.e., by generating a visible light, when the respective one of the photo-detectors 324 generates the output signal. In this embodiment, each of the indicator units 325 includes a light source. Preferably, the light source is a light-emitting diode.

The apparatus 3 further includes a driver module 323 mounted in the body 31. As shown in FIG. 2, the driver module 323 includes a set of amplifier units 326, each of which is coupled to a respective one of the photo-detectors 324 and a respective one of the indicator units 325. Each of the amplifier units 326 is operable so as to amplify the output signal generated by a respective one of the photo-detectors 324 to drive a respective one of the indicator units 325.

It is noted that the upper left quadrant occupies a larger area of the surface of the body 31 than the lower right quadrant. The construction as such permits the number of indicator units 325, which can be mounted on the body 31, to be greater than that of the photo-detectors 324. As such, visibility of the light generated by the indicator units 325 of the indicator module 322 can be enhanced. In this embodiment, the number of indicator units 325 is equal to that of the photo-detectors 324.

The body 31 further includes first and second flanges 314, 315 that extend outwardly and respectively from first and second sides of the body 31. Each of the first and second flanges 314, 315 is formed with holes 313 therethrough (only the holes 313 in the first flange 314 are visible in FIG. 1). In this embodiment, the first flange 314 is a left flange, and the second flange is the right flange. The body 31 is adapted to be mounted on a wall 4 by means of fasteners 316 that pass through the holes 313 and that are fastened to the wall 4.

A method for calibrating the optical axis (A) of the light beam generated by the light emitter 23 of the light-emitting instrument 2 using the apparatus 3 of the first preferred embodiment includes the steps of:

1. mounting the body 31 on the wall 4 by means of the fasteners 316;

2. with the light-emitting instrument 2 disposed at a distance away from the body 31, aligning the cross hair 221 on the sighting unit 22 of the light-emitting instrument 2 with the reference mark 312 on the surface 311 of the body 31;

3. inspecting which one of the indicator units 325 of the indicator module 322 is activated as a result of generation of the output signal by the respective one of the photo-detectors 324, which in turn is a result of receipt by the respective one of the photo-detectors 324 of the light beam generated by the light emitter 23 of the light-emitting instrument 2; and 4. calibrating the optical axis (A) of the light emitter 23 of the light-emitting instrument 2 until the indicator unit 325 corresponding to the specified one of the photo-detectors 324 of the sensor module 321, i.e., the centermost one of the photo-detectors 324 of the sensor module 321 having the reference position relationship with the reference mark 312, is activated as a result of receipt by the specified one of the photo-detectors 324 of the light beam generated by the light emitter 23 of the light-emitting instrument 2.

Because the position of the incident light beam on the surface 311 of the body 31 can be indicated to the tester by the indicator module 322 of the apparatus 3 of this invention, the tester does not have to walk back and forth between the body 31 and the light-emitting instrument 2 during the calibration procedure.

Figure 3:
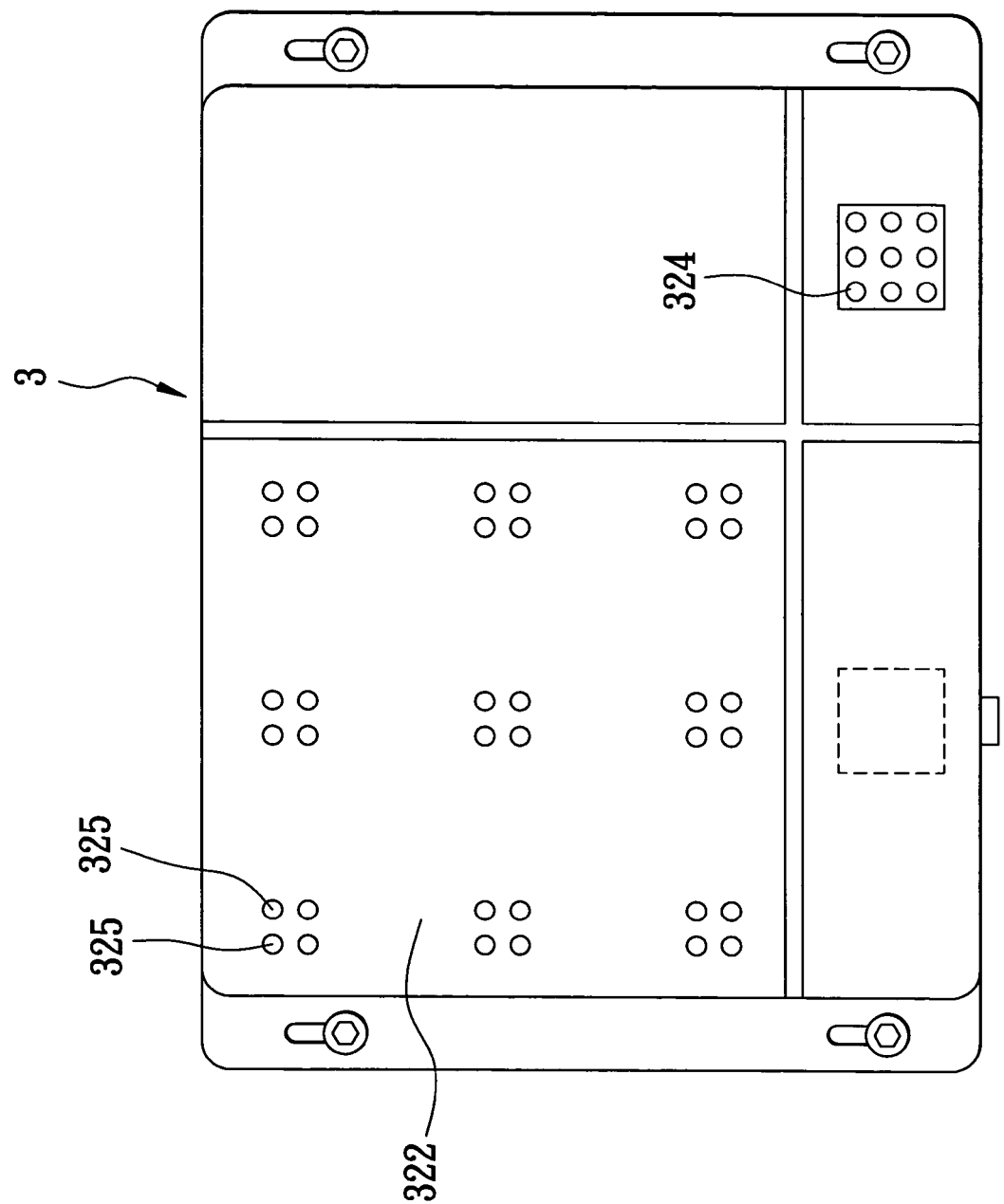
FIG. 3 is a schematic view of the second preferred embodiment of an apparatus for indicating position of an incident light beam according to the present invention.

FIG. 3 illustrates the second preferred embodiment of an apparatus 3 for indicating position of the incident light beam. When compared with the previous embodiment, the number of indicator units 325 is greater than the number of the photo-detectors for improved visibility at farther distances. As shown, each of the indicator units 325 of the indicator module 322 includes a set of light sources.

It should be apparent to those skilled in the art that the exact position of the indicator module 322 relative to the body 31 and the particular configuration of the indicator module 322 should not be limited to those of the preferred embodiments. For example, the indicator module 322 may be separated from the body 31 such that it can be disposed close to the light-emitting instrument 2. Moreover, the function of indicating which one of the photo-detectors 324 generated the output signal can be realized by implementing the indicator module 322 in the form of other suitable devices, such as a display device.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An apparatus for calibration of an optical axis of a light beam generated by a light emitter of a light-emitting instrument, the light-emitting instrument further including a sighting unit having a specified position relationship with the light emitter, said apparatus comprising:
    a body having a surface provided with a cross hair, the cross hair including a pair of lines intersecting at a reference point and dividing said surface into an upper left quadrant, an upper right quadrant, a lower left quadrant and a lower right quadrant;
    a sensor module mounted on said lower right quadrant including an array of photo-detectors, each adapted to generate an output signal upon receipt of the light beam, a centermost one of said array of photo-detectors having a reference position relationship with said reference point of said cross hair corresponding to the specified position relationship between the sighting unit and the light emitter;
    an indicator module mounted on said upper left quadrant and including an array of indicator units, each corresponding to a respective one of said photo-detectors and capable of providing an indication when the respective one of said photo-detectors generates the output signal; and
    a driver module mounted on said body including a plurality of amplifier units, each coupled to a respective one of said photo-detectors and a respective one of said indicator units, each of the amplifier units being operable to amplify the output signal generated by a respective one of the photo-detectors to drive a respective one of the indicator units.

2. The apparatus as claimed in claim 1, wherein said upper left quadrant occupies a larger area of said surface of said body than said lower right quadrant.

3. The apparatus as claimed in claim 2, wherein the number of indicator units is equal to the number of photo-detectors.

4. An apparatus for calibration of an optical axis of a light beam generated by a light emitter of a light-emitting instrument, the light-emitting instrument further including a sighting unit having a specified position relationship with the light emitter, said apparatus comprising:
    a body having a surface provided with a cross hair;
    a sensor module mounted on said surface and including a plurality of photo-detectors, each adapted to generate an output signal upon receipt of the light beam, a specified one of said photo-detectors having a reference position relationship with said reference mark, the reference position relationship corresponding to the specified position relationship between the sighting unit and the light emitter;
    an indicator module mounted on said surface and coupled to said sensor module including a plurality of indicator units, each corresponding in position to a respective one of said photo-detectors and capable of providing an indication when the respective one of said photo-detectors generates the output signal; and
    a driver module mounted on said body including a plurality of amplifier units, each coupled to a respective one of said photo-detectors and a respective one of said indicator units, each of the amplifier units being operable to amplify the output signal generated by a respective one of the photo-detectors to drive a respective one of the indicator units.

5. The apparatus as claimed in claim 4, wherein said reference mark divides said surface of said body into different quadrants, said sensor module and said indicator module being mounted on different ones of said quadrants of said surface.

6. The apparatus as claimed in claim 4, wherein the number of indicator units is equal to the number of photo-detectors.

7. An apparatus for calibration of an optical axis of a light beam generated by a light emitter of a light-emitting instrument, the light-emitting instrument further including a sighting unit having a specified position relationship with the light emitter, said apparatus comprising:
    a body having a surface provided with a cross hair, the cross hair including a pair of lines intersecting at a reference point and dividing said surface into an upper left quadrant, an upper right quadrant, a lower left quadrant, and a lower right quadrant;
    a sensor module mounted on said lower right quadrant including a plurality of photodetectors, adapted to generate an output signal upon receipt of the light beam, a centermost one of said photodetectors having a reference position relationship with said reference point of said cross hair, corresponding to the specified position relationship between the sighting unit and the light emitter;
    an indicator module mounted on said upper left quadrant for indicating which one of said photo-detectors generated the output signal; and
    a driver module mounted on said body, including a plurality of amplifier units, each coupled to a respective one of said photo-detectors and a respective one of said indicator units, each of the amplifier units being operable to amplify the output signal generated by a respective one of the photo-detectors to drive a respective one of the indicator units.

* * * * *